United States Patent [19]

Sharma

[11] Patent Number: 4,615,369

[45] Date of Patent: Oct. 7, 1986

[54] ADHESION OF BRASS PLATED STEEL TO RUBBER

[75] Inventor: Satish C. Sharma, Mogadore, Ohio

[73] Assignee: GenCorp, Akron, Ohio

[21] Appl. No.: 830,161

[22] Filed: Feb. 18, 1986

[51] Int. Cl.$^4$ ................................................ B60C 9/02
[52] U.S. Cl. .................................... 152/565; 156/910; 428/250; 428/256; 428/263; 428/285; 428/295; 428/390
[58] Field of Search ................ 524/325, 360; 152/565; 156/124, 910; 428/250, 251, 256, 263, 285, 295, 390, 260

[56] References Cited

U.S. PATENT DOCUMENTS

| 3,793,132 | 2/1974 | Bhakuni et al. | 156/910 |
| 3,897,583 | 7/1975 | Bellamy | 428/256 |
| 4,269,250 | 5/1981 | Harrison | 428/256 |

FOREIGN PATENT DOCUMENTS

| 0062544 | 6/1974 | Japan | 524/325 |
| 766405 | 1/1957 | United Kingdom | 524/325 |

OTHER PUBLICATIONS

W. J. van Ooij, Rubber Chemistry & Technology, 57 (3) 421–456 (1984).
P. Gupta, R. S. Chaudhary, T. K. G. Namboodhiri, B. Prakash and B. B. Prasad, Corrosion, 40 (1), 33–36 (1984).

Primary Examiner—James J. Bell

[57] ABSTRACT

The use of a small amount of a polyhydroxy containing anthraquinone compound in a rubber ply or skim stock greatly improves the humid aged adhesion of the rubber stock to brass plated steel cords or fabric. This invention is particularly useful in tires with steel cords or belts. The following formula describes the anthraquinone compound:

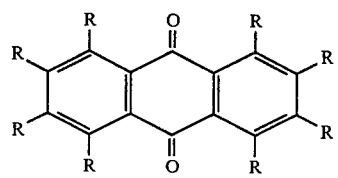

where two of the R's are hydroxyl radicals and the remaining R's are selected from the group consisting of —H, —OH, —CH$_3$, —NO$_2$, —CH$_2$OH and —COOH, at least four of the remaining R's being —H.

9 Claims, No Drawings

ADHESION OF BRASS PLATED STEEL TO RUBBER

This invention relates to the adhesion of brass to rubber, and particularly, to the the adhesion of brass-plated steel tire cord (wire) to rubber.

BACKGROUND OF THE INVENTION

The performance of steel cord (brass plated)-rubber composites (e.g., tires) is determined by the properties of the individual components (i.e., steel cord and rubber) as well as by the adhesion between the components. Improvements in aged properties of the steel cord skim compounds and in cord-rubber humid aged adhesion retention are being sought continually in efforts to improve the service life of steel reinforced tires. Unfortunately, some of the compounding variations that can improve cord-rubber adhesion retention (e.g., high sulfur levels, high sulfur/accelerator ratio) have a detrimental effect on aged properties of the rubber compounds. Additives that can improve aged adhesion retention without effecting aged properties of the rubber compound can, therefore, be very valuable in improving the long-term durability of tires.

It has been suggested[1] that "dezincification" of the brass layer during humid aging can be a major cause of loss of brass-rubber adhesion on humid aging. The term dezincification is poorly defined and constitutes a complex set of reactions/processes[1]. Corrosion inhibitors for dezincification resistance improvement have, however, not yet been described (page 453)[1]. A recent brass corrosion study[2] suggests that certain materials such as alizarin (1,2-dihydroxyanthraquinone) may reduce the dezincification of brass sheet (63% Cu and 37% Zn) immersed in 1% $H_2SO_4$ solution at 30° C. for two days.

Accordingly, it is an object of the present invention to overcome the difficulties alluded to above and to provide a brass-rubber composite exhibiting an improved brass-rubber bond.

Another object is to increase the resistance of the rubber-brass bond to degradation caused by heat and moisture.

These and other objects and advantages of the present invention will become more apparent to those skilled in the art from the following detailed description and working examples.

SUMMARY OF THE INVENTION

It has been discovered that the addition of about 0.2 to 1.5 phr of a polyhydroxy containing anthraquinone compound to a rubber skim or ply composition can substantially improve the long-term humid aged adhesion retention of a brass coated or plated steel cord-rubber composite containing this skim compound. The adhesion improvement with this compound is obtained without any adverse effects on the properties (Mooney viscosity, cure characteristics, tensile, fatigue, etc.) of the skim composition.

It is believed that the anthraquinone compound reacts with the zinc in the brass to reduce the diffusion of copper through the plating. Accordingly, this reduces the formation of excess copper sulfide during humidity aging and results in the maintenance of adhesion without adversely affecting the physical properties of the rubber compound per se.

DISCUSSION OF DETAILS AND PREFERRED EMBODIMENTS

Brass plated steel tire cords (wires), are well known for use in the belts and carcasses of passenger, truck and off-the-road tires and for other purposes like belts. The wire may be woven or non-woven filaments of steel, and the wires or cords when used in tires are usually called a fabric. The steel may be dipped, electroplated or otherwise coated with the brass as is well known. The brass plating should be complete although some iron may be exposed on commercially brass plated steel cords. Usually the brass is deposited as a thin coating on the steel, usually not over about 1.2% by weight of the steel. The brass may contain from about 60 to 95% by weight of copper, preferably from about 62 to 72% by weight of copper. The balance being essentially zinc except for very minor amounts of other elements or compounds as adventitious or alloying materials. For more information on brass please see "Encyclopedia Of Chemical Technology," Kirk-Othmer, 2nd Ed., Vol. 6, pages 183 to 265, 1965, Interscience Publishers, a division of Johm Wiley & Sons, Inc., New York.

The polyhydroxy containing anthraquinone compound used has the following formula:

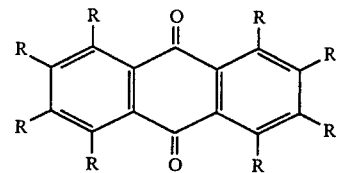

where two of the R's are hydroxyl radicals and the remaining R's are selected from the group consisting of —H, —OH, —CH₃, —NO₂, —CH₂OH and —COOH, at least four of the remaining R's being —H.

Examples of the polyhydroxy anthraquinone compounds are 1,2-dihydroxy-anthraquinone (alizarin, preferred); 1,2-dihydroxy-3-nitro-anthraquinone; 1,2,3-trihydroxyanthraquinone; 1,5-dihydroxy-anthraquinone; 1,8-dihydroxyanthraquinone; 1,4-dihydroxy-anthraquinone; 1.8-dihydroxy-3-(hydroxymethyl)anthraquinone; 1,8-dihydroxy-3-methylanthraquinone; 1,3,8-trihydroxy-6-methyl-anthraquinone; 1,3-dihydroxyanthraquinone-2-carboxylic acid; 1,2,4-trihydroxyanthraquinone; 1,2,5,8-tetrahydroxy-anthraquinone; 1,8-dihydroxyanthraquinone-3-carboxylic acid; 1,3-dihydroxy-2-methylanthraquinone and the like and mixtures of the same.

After mixing the anthraquinone compound with rubber and the other compounding ingredients and so forth the rubber composition (ply or skim) stock is then combined (embedded with, calendered, coated, laminated and so forth) with the brass plated steel cords or fabric, built into a green tire and then vulcanized in a suitable mold.

The rubber to which the cord is to be bonded is preferably natural rubber, cis-polyisoprene or mixtures thereof. However, blends thereof with other rubbery polymers like rubbery emulsion butadiene-styrene copolymers, polybutadienes and/or solution butadiene polymers and butadiene-styrene copolymers can be used. For products other than tires there can be used nitrile rubber, polychloroprene and so forth. These rubbers can be suitably compounded with carbon black, silica, zinc oxide, stearic acid, antioxidants, accelerators, resins, sulfur and so forth.

Brass plated steel tire cords treated according to the present invention can be used in one or more belts and/or one or more plies, carcasses of pneumatic tires like passenger, truck, off-the-road and other vehicle tires, in belts and hose and for other purposes. Rubber compositions containing certain anthraquinone compounds disclosed herein, also, may be useful in improving the humid aging of bronze coated or plated steel bead wires of tires.

The following examples will serve to illustrate the present invention with more particularity to those skilled in the art.

EXAMPLE 1

A rubber compound (ply or skim compound) was formulated and mixed as shown in Tables I and II, below:

TABLE I
COMPOUND A RECIPE

| Ingredient | Parts By Weight |
| --- | --- |
| Natural Rubber (#3 Ribbed Smoked Sheet) | 100 |
| ASTM N326-Carbon Black (High abrasion furnace, low structure) | 60 |
| Zinc Oxide | 10 |
| Aromatic Oil | 3 |
| Stearic Acid | 1 |
| Resin | 2 |
| Hi-Sil[1] | 5 |
| Tackifier | 2 |
| Antioxidant | 2 |
| Rubber to Metal Bonding Additive[2] | 0.5 |
| Resorcinol | 2.4 |
| Formaldehyde Donor[3] | 3.33 |
| Vulkacit DZ[4] - Accelerator | 1, 1.75 (Variable) |
| Crystex[5] (80% sulfur) | 5, 6.25 (Variable) |
| Alizarin[6] | 0-1 (Variable) |

[1] Precipitated hydrated amorphous silica - PPG Industries, Inc.
[2] Cobalt-borate neodecanoate, "Manobond" C-16 - Wyrough and Loser, Inc.
[3] Hexamethyoxymethylmelamine, CYREZ 963 resin - American Cyanamid Company
[4] N,N—dicyclohexyl-2-benzothiazyl sulphenamide - Mobay Chemical Co.
[5] 20% oil treated-insoluble sulfur - Stauffer Chemical Co.
[6] 1,2-dihydroxyanthraquinone - Aldrich Chemical Co.

Compound A was the basic compound used in the working examples.

TABLE II
COMPOUND A MIXING PROCEDURE

Masterbach (MB) - Banbury Mixer at 120° F.
- 0' Load rubber
- 1' Add ½ black + HiSil
- 2' Add ½ black + ZnO
- 3' Add the rest (up to and including the Antioxidant of the ingredients of Compound A of Table I)
- 5' Dump or at 310° F.

Finished Compounds
1st Pass (Cold Banbury)
- 0' Load MB
- 1½' Add resorcinol, MANOBOND C-16 and alizarin
- 3' Dump or at 250° F. to make compound MB-1

2nd Pass
- 0' Add mixture of ½ of compound MB-1 with CRYSTEX, VULKACIT DZ and CYREZ
- 3' Add the rest of compound MB-1 and dump or at 190° F. to make Basic Compound A

EXAMPLE 2

Compound A of EXAMPLE 1, Tables I and II, above, containing various blends of sulfur, accelerator and alizarin was tested using the Mooney viscometer and the Monsanto Rheometer. The results of the tests are shown in Table III, below:

TABLE III
MOONEY AND RHEOMETER CHARACTERISTICS OF SERIES OF BASIC A COMPOUND

| Basic Compound A, No. | 1 | 2 | 3 |
| --- | --- | --- | --- |
| Sulfur (phr) | 4.0 | 4.0 | 4.0 |
| Accelerator (phr) | 1.75 | 1.75 | 1.75 |
| Alizarin (phr) | 0 | 0.3 | 0.6 |
| Mooney Viscometer, ML 1 + 4 at 212° F. | | | |
| non-curing | | | |
| 0 minutes | 87 | 88 | 91 |
| 1½ minutes | 77 | 78 | 89 |
| 4 minutes | 75 | 76 | 79 |
| Monsanto Rheometer (curing), (307° F., 100 cpm, ±1°) | | | |
| Minimum Torque, in-lbs | 12.7 | 12.1 | 12.2 |
| Maximum Torque, in-lbs | 54.5 | 54.9 | 53.2 |
| Torque at 30 minutes, in-lbs | 54.3 | 54.6 | 53.0 |
| Torque at 60 minutes, in-lbs | 53.7 | 53.0 | 51.3 |
| 2 Pt. Rise, minutes | 2.9 | 3.1 | 3.5 |
| 5 Pt. Rise, minutes | 4.8 | 5.2 | 5.7 |
| 25% Cure Time, minutes | 6.8 | 7.4 | 7.8 |
| 50% Cure Time, minutes | 9.4 | 10.2 | 10.9 |
| 75% Cure Time, minutes | 12.9 | 13.8 | 14.75 |
| 90% Cure Time, minutes | 17.2 | 18.3 | 19.2 |
| 100% Cure Time, minutes | 35.5 | 34.0 | 34.5 |
| Basic Compound A, No. | 4 | 5 | 6 |
| Sulfur (phr) | 5.0 | 5.0 | 5.0 |
| Accelerator (phr) | 1.0 | 1.0 | 1.0 |
| Alizarin (phr) | 0 | 0.3 | 0.6 |
| Mooney Viscometer, ML 1 + 4 at 212° F. | | | |
| non-curing | | | |
| 0 minutes | 87 | 90 | 92 |
| 1½ minutes | 78 | 80 | 80 |
| 4 minutes | 76 | 78 | 79 |
| Monsanto Rheometer (curing), (307° F., 100 cpm, ±1°) | | | |
| Minimum Torque, in-lbs | 12.7 | 11.8 | 12.0 |
| Maximum Torque, in-lbs | 55.3 | 54.4 | 52.4 |
| Torque at 30 minutes, in-lbs | 52.8 | 52.7 | 50.2 |
| Torque at 60 minutes, in-lbs | 55.3 | 54.3 | 52.4 |
| 2 Pt. Rise, minutes | 2.6 | 3.2 | 3.4 |
| 5 Pt. Rise, minutes | 4.7 | 5.3 | 5.8 |
| 25% Cure Time, minutes | 6.95 | 7.8 | 8.45 |
| 50% Cure Time, minutes | 10.0 | 11.0 | 12.2 |
| 75% Cure Time, minutes | 15.1 | 15.6 | 17.5 |
| 90% Cure Time, minutes | 24.1 | 22.8 | 25.0 |
| 100% Cure Time, minutes | 60.0+ | 51.0 | 53.5 | phr - parts by weight per 100 parts by weight of rubber

The viscosities and cure characteristics of the compounds containing 0–0.6 phr alizarin from the data in Table III show that the addition of alizarin to these compounds improves the scorch resistance and marginally increases the Mooney viscosity. No other significant effects on cure characteristics are observed with the addition of alizarin under these test conditions.

EXAMPLE 3

Brass plated steel wire tire cords were embedded in rubber Compound A of Tables I and II, above, cured and tested. The results of the tests are shown in Table IV, below.

TABLE IV
EFFECT OF ALIZARIN ON WIRE-RUBBER ADHESION

| Brass Plated Steel | Basic | Sulfur | Accelerator | Alizarin |

TABLE IV-continued
EFFECT OF ALIZARIN ON WIRE-RUBBER ADHESION

| Wire Cord Used | Compound A, No. | (phr) | (phr) | (phr) |
|---|---|---|---|---|
| 3 × .20 mm + 6 × .35 mm | 1 | 4.0 | 1.75 | 0 |
| 64.3% Copper, bal. Zn | 2 | 4.0 | 1.75 | 0.3 |
| 3.1 g/kg # | 3 | 4.0 | 1.75 | 0.6 |
|  | 4 | 5.0 | 1.0 | 0 |
|  | 5 | 5.0 | 1.0 | 0.3 |
|  | 6 | 5.0 | 1.0 | 0.6 |
| 3 × .20 mm + 6 × .35 mm | 1 | 4.0 | 1.75 | 0 |
| 67.3% Copper, Bal. Zn | 2 | 4.0 | 1.75 | 0.3 |
| 3.4 g/kg # | 3 | 4.0 | 1.75 | 0.6 |
|  | 4 | 5.0 | 1.0 | 0 |

| Brass Plated Steel Wire Cord Used | Basic Compound A, No. | Pullout Force* lbs. & Rubber Coverage (%) Humid Aging Time, **Days | | | |
|---|---|---|---|---|---|
|  |  | 0 | 3 | 7 | 14 |
| 3 × .20 mm + | 1 | 296 (95) | 284 (90) | 248 (75) | 202 (40) |
| 6 × .35 mm | 2 | 297 (95) | 278 (90) | 239 (75) | 220 (60) |
| 64.3% Copper, | 3 | 301 (90) | 263 (85) | 249 (75) | 219 (50) |
| bal. Zn | 4 | 286 (95) | 285 (95) | 250 (95) | 185a (75) |
| 3.1 g/kg # | 5 | 307 (98) | 272 (98) | 251 (98) | 223 (95) |
|  | 6 | 297 (95) | 274 (95) | 246 (95) | 213 (95) |
| 3 × .20 mm + | 1 | 275a (95) | 269 (90) | 240 (90) | 225 (75) |
| 6 × .35 mm | 2 | 278a (95) | 262 (85) | 231 (85) | 222 (75) |
| 67.3% Copper, | 3 | 269 (85) | 252a (80) | 242 (85) | 223 (75) |
| bal. Zn | 4 | 284 (98) | 265 (95) | 218a (90) | 149a (50) |
| 3.4 g/kg # |  |  |  |  |  |

*5/8" embedment test similar to ASTM D-2229-80 test (Rubber Property - Adhesion To Steel Cord) except that the rubber block was reinforced with steel plates on two sides
**200° F., 95% R.H. (relative humidity) in humidity cabinet. a Rubber chunking. This may have reduced the pullout force.
Grams brass/kilogram steel.

The aged adhesion data from Table IV for this series of compounds show the following:

1. For low copper (brass) plating, the addition of 0.3–0.6 phr alizarin in the skim compounds improved the long-term (14 day) humid aged adhesion (by 8–10%) and rubber coverage (by 10–20%).
2. For standard copper (brass) plating, the addition of alizarin to the skim compounds did not show any advantage in humid aging for up to 14 days. Longer or more severe aging (e.g., steam aging) tests may be needed to determine if the addition of alizarin offers any advantages in the case of standard copper (brass) platings.

Some recent trends in the tire industry indicate that the lower copper content brass plating is preferred.

EXAMPLE 4

Additional brass plated steel wire tire cords were embedded in rubber Compound A* of Tables I and II, above, cured and tested as to wire cord-rubber adhesion. The embedment and test used were the same as shown in Table IV. The results of the adhesion tests are shown in Table V, below:

*Similar to compounds of Table IV series in composition, except as noted above.

TABLE V

| Basic Compound A, No. | Sulfur (phr) | Accelerator (phr) | Alizarin (phr) | Pullout Force lbs. and Rubber Coverage (%) Humid Aging Time, **Days | | | |
|---|---|---|---|---|---|---|---|
|  |  |  |  | 0 | 3 | 7 | 14 |
| 10 | 4.0 | 1.75 | 0 | 298 (98) | 214 (90) | 199 (50) | 179 (50) |
| 11 | 4.0 | 1.75 | 0.5 | 307 (95) | 266 (90) | 252 (90) | 220 (85) |
| 12 | 4.0 | 1.75 | 1.0 | 286 (85) | 269 (85) | 240 (70) | 220 (65) |

**200° F., 95% R.H. in humidity cabinet

Brass plated steel wire cord used: 64.3% copper bal. Zn, 3.1 g/kg, 3×0.2 mm+6×0.35 mm The data of Table V clearly show that the addition of alizarin has a beneficial effect on humid aged wire-rubber adhesion retention. The data in Table V combined with the data in Table IV suggest that the optimum level of alizarin in this formulation is less than about 1 phr.

EXAMPLE 5

Additional compounds based on Compound A of Tables I and II, above, containing various levels of alizarin were further tested using the Mooney viscometer and Monsanto rheometer. The results obtained on testing are shown in Table VI, below:

TABLE VI

| Basic Compound A, No. | 20 | 21 | 22 |
|---|---|---|---|
| Alizarin (phr) | 0 | 0.3 | 0.6 |
| Mooney Viscometer, ML 1 + 4 at 212° F. Non-curing | | | |
| 0 minutes | 86 | 84 | 90 |
| 1½ minutes | 74 | 75 | 76 |
| 4 minutes | 72 | 72 | 74 |
| Monsanto Rheometer (curing) (307° F., 100 cpm ±1°) | | | |
| Minimum Torque, in-lbs. | 10.8 | 10.2 | 10.3 |
| Maximum Torque, in-lbs. | 52.8 | 52.8 | 51.9 |
| Torque at 30 minutes, in-lbs. | 52.6 | 52.1 | 51.1 |
| Torque at 60 minutes, in-lbs. | 50.6 | 50.8 | 50.0 |
| 2 Pt. Rise, minutes | 3.4 | 3.3 | 3.7 |
| 5 Pt. Rise, minutes | 5.3 | 5.3 | 5.7 |
| 25% Cure Time, minutes | 7.4 | 7.6 | 8.1 |
| 50% Cure Time, minutes | 10.3 | 10.8 | 11.8 |
| 75% Cure Time, minutes | 14.2 | 15.0 | 16.2 |

TABLE VI-continued

| Basic Compound A, No. | 20 | 21 | 22 |
|---|---|---|---|
| 90% Cure Time, minutes | 18.8 | 20.0 | 21.4 |
| 100% Cure Time, minutes | 32.2 | 34.3 | 33.8 |

All compounds contained 4 phr sulfur and 1.75 phr accelerator.

The data in Table VI show that alizarin addition has no significant effect on the cure characteristics of the compound.

EXAMPLE 6

Additional brass plated steel wire cord rubber adhesion tests were conducted. The cords were embedded in rubber, cured and tested. The embedment and test used were the same as shown in Table IV, above:

TABLE VII

| Basic Compound A, No. | Alizarin (phr) | Pullout Force lbs and Rubber Coverage (%) Humid Aging* Time, Days | | | |
|---|---|---|---|---|---|
| | | 0 | 3 | 7 | 14 |
| 20 | 0 | 314 (98) | 260 (95) | 245 (75) | 183 (50) |
| 21 | 0.3 | 309 (95) | 271 (95) | 250 (85) | 231 (75) |
| 22 | 0.6 | 302 (95) | 263 (95) | 257 (90) | 235 (75) |

*200° F., 95% R.H. in humidity cabinet

Cord used: 64.3% copper bal. Zn, 3.1 g/kg, 3×0.20 mm+6×0.35 mm

The adhesion data for this series of compounds, as shown by Table VII above once again confirm the beneficial effects of alizarin addition on wire-rubber humid aged adhesion retention.

EXAMPLE 7

Additional runs were made using alizarin in which the compounds were cured and tested for their physical properties. The results obtained are set forth below in Table VIII.

TABLE VIII

| Basic Compound A, No. | 20 | 21 | 22 |
|---|---|---|---|
| Alizarin (phr) | 0 | 0.3 | 0.6 |
| Property* | | | |
| Unaged Properties | | | |
| 100% M, psi | 880 | 880 | 900 |
| 300% M, psi | 2910 | 2980 | 2990 |
| Tensile, psi | 3395 | 3445 | 3425 |
| Elongation, % | 360 | 355 | 360 |
| Shore A Hardness | 84 | 82 | 81 |
| Crescent Tear, lbs/in | 595 | 590 | 725 |
| Wide Trouser Tear (212° F.), lbs/in | 39 | 40 | 38 |
| DeMattia (pierced, 180° angle, 212° F.) Crack Growth (30 kc), in | 0.81 | 0.78 | 0.63 |
| Aged (21 days, 93° C., vacuum) Properties | | | |
| 100% M, psi | 860 | 830 | 865 |
| 300% M, psi | 2830 | 2830 | 2945 |
| Tensile, psi | 3270 | 3200 | 3360 |
| Elongation, % | 360 | 350 | 355 |
| Shore A Hardness | 81 | 80 | 81 |
| Crescent Tear, lbs/in | 430 | 485 | 600 |
| Wide Trouser Tear (212° F.), lbs/in | 17 | 24 | 23 |
| DeMattia (pierced, 180° angle, 212° F.) Crack Growth (10 kc), in | 0.76 | 0.94 | 0.77 |

*Tensile sheets were cured at 287° F./45 minutes and DeMattia samples were cured at 287° F./50 minutes
kc: kilocycles
M: Modulus
psi: pounds per square inch
Tensile: tensile strength at break
Elongation: elongation at break Table VIII shows data on the unaged and aged physical properties of the above compounds. The data show that the addition of alizarin has no detrimental effects on the physical properties of these compounds. The compound with 0.3 phr alizarin, 21, does show somewhat higher crack growth on aging than the corresponding control 20. This difference, however, must be attributed to experimental variability since the compound with 0.6 phr alizarin, 22, is equivalent to the control in crack growth.

In all three sets of data (Tables IV, V and VII) the alizarin containing compounds generally performed better than the corresponding control in humid aged adhesion retention. After 14-day humid aging, the alizarin containing compounds gave 9–28% higher adhesions and 10–25% higher rubber coverage than that of the control when low copper plating was used. The adhesion improvement obtained with alizarin addition is, therefore, very consistent.

REFERENCES

1. W. J. van Oiij, Rubber Chemistry & Technology, 57 (3) 421–456 (1984).
2. P. Gupta, R. S. Choudhry, T. K. G. Namboodhiri, B. Prakash and B. B. Prasad, Corrosion 40 (1), 33–36 (1984).

I claim:

1. A composition of matter comprising a rubber having from about 0.2 to 1.5 parts by weight per 100 parts by weight of the rubber of at least one compound having the formula:

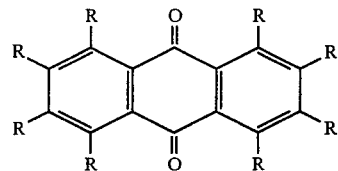

where two of the R's are hydroxyl radicals and the remaining R's are selected from the group consisting of —H, —OH, —CH$_3$, —NO$_2$, —CH$_2$OH and —COOH, at least four of the remaining R's being —H.

2. A composition of matter according to claim 1 where said rubber is selected from the group consisting of natural rubber and high cis-polyisoprene and mixtures of the same and where said compound is 1,2-dihydroxyanthraquinone.

3. An article of manufacture having a vulcanized rubber composition reinforced with brass plated steel cords or fabric, the rubber of said composition containing from about 0.2 to 1.5 parts by weight per 100 parts by weight of the rubber of at least one compound having the formula:

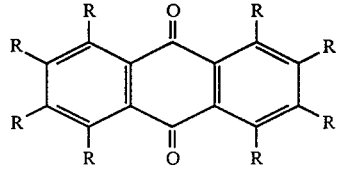

where two of the R's are hydroxyl radicals and the remaining R's are selected from the group consisting of —H, —OH, —CH$_3$, —NO$_2$, —CH$_2$OH and —COOH, at least four of the remaining R's being —H.

4. An article of manufacture according to claim 3 wherein the rubber is selected from the group consisting of natural rubber and high cis-polyisoprene and mixtures of the same and where said compound is 1,2-dihydroxyanthraquinone.

5. A vulcanized pneumatic tire reinforced with brass plated steel cords or fabric and adhered to said cords or fabric a ply or skim rubber composition, the rubber of said composition containing from about 0.2 to 1.5 parts by weight per 100 parts by weight of said rubber of at least one compound having the formula:

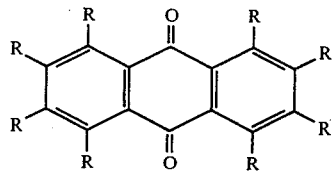

where two of the R's are hydroxyl radicals and the remaining R's are selected from the group consisting of —H, —OH, —CH$_3$, —NO$_2$, —CH$_2$OH and —COOH, at least four of the remaining R's being —H.

6. A vulcanized pneumatic tire according to claim 5 wherein said brass plated steel cords or fabric are carcass and/or belt brass plated steel cords or fabric.

7. A vulcanized pneumatic tire according to claim 6 wherein said rubber of said composition is selected from the group consisting of natural rubber and high cis-polyisoprene rubber and mixtures of the same and wherein said compound is 1,2-dihydroxyanthraquinone.

8. The method which comprises mixing an anthraquinone compound with a vulcanizable unvulcanized rubber composition to form ply or skim stock, coating brass plated steel cords or fabric with said composition to form a carcass ply and/or belt reinforcement for a tire, assembling said carcass ply and/or belt with other tire components to build a green tire and molding and vulcanizing said green tire to form a pneumatic tire, said compound being used in an amount of from about 0.2 to 1.5 parts by weight per 100 parts by weight of the rubber in said composition and said compound being at least one compound having the formula:

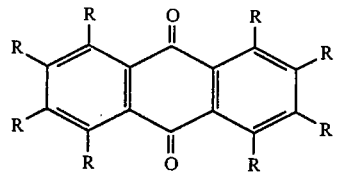

where two of the R's are hydroxyl radicals and the remaining R's are selected from the group consisting of —H, —OH, —CH$_3$, —NO$_2$, —CH$_2$OH and —COOH, at least four of the remaining R's being —H.

9. The method according to claim 8 where the rubber of said composition is selected from the group consisting of natural rubber and high cis-polyisoprene rubber and mixtures of the same and where said compound is 1,2-dihydroxyanthraquinone.

* * * * *